United States Patent
Keddem et al.

(10) Patent No.: US 10,701,211 B2
(45) Date of Patent: Jun. 30, 2020

(54) METHOD OF CONTROLLING COMMUNICATIONS WITHIN A DIGITAL INTERCOM SYSTEM

(71) Applicant: David Clark Company Incorporated, Worcester, MA (US)

(72) Inventors: Natan Keddem, Upton, MA (US); Nicholas Cannata, Sutton, MA (US)

(73) Assignee: David Clark Company Incorporated, Worcester, MA (US)

( * ) Notice: Subject to any disclaimer, the term of this patent is extended or adjusted under 35 U.S.C. 154(b) by 0 days.

(21) Appl. No.: 16/269,867

(22) Filed: Feb. 7, 2019

(65) Prior Publication Data

US 2019/0174005 A1 Jun. 6, 2019

Related U.S. Application Data

(62) Division of application No. 15/894,254, filed on Feb. 12, 2018, now Pat. No. 10,237,415.

(60) Provisional application No. 62/457,426, filed on Feb. 10, 2017.

(51) Int. Cl.
*H04M 3/42* (2006.01)
*H04M 9/00* (2006.01)
*H04M 1/05* (2006.01)
*H04B 3/54* (2006.01)
*H04M 1/725* (2006.01)
*H04M 1/18* (2006.01)

(52) U.S. Cl.
CPC ............ *H04M 9/001* (2013.01); *H04B 3/548* (2013.01); *H04M 1/05* (2013.01); *H04M 1/72513* (2013.01); *H04B 2203/545* (2013.01); *H04B 2203/5445* (2013.01); *H04M 1/18* (2013.01); *H04M 2201/42* (2013.01); *H04M 2207/40* (2013.01)

(58) Field of Classification Search
CPC ............... H04M 1/18; H04M 1/72513; H04M 2207/40; H04M 9/001; H04M 1/05; H04M 2201/42; H04B 2203/5445; H04B 2203/545; H04B 3/548; H04L 67/025; H04L 41/0806; H04L 41/22; H04L 67/34; H04W 4/06; H04W 4/10; H04W 4/48; H04W 4/50; H04W 88/16
USPC ........................................... 455/414.1–414.4
See application file for complete search history.

(56) References Cited

U.S. PATENT DOCUMENTS

| | | | |
|---|---|---|---|
| 4,698,839 A * | 10/1987 | DeVaney | H04W 88/14 455/560 |
| 5,400,246 A | 3/1995 | Wilson | |
| 8,290,526 B2 | 10/2012 | Broadley | |
| 8,456,985 B2 | 6/2013 | Hannosh | |

(Continued)

*Primary Examiner* — Ronald Eisner
(74) *Attorney, Agent, or Firm* — Burns & Levinson LLP; Steven M. Mills

(57) ABSTRACT

A method of managing communications between communication devices within a digital intercom system includes providing input and output tables for each communication device. The tables for each device are made up of cells formed from linear arrays corresponding to communication channels and the other devices. When two devices communicate on a given channel, a cell in the appropriate input and output table is identified based on the channel and the devices communicating. The cells provide volume control information which can be relied upon to determine if or to what degree audio signals should be transferred between the devices.

7 Claims, 11 Drawing Sheets

(56) References Cited

U.S. PATENT DOCUMENTS

| | | |
|---|---|---|
| 8,626,957 B2 | 1/2014 | Blumrich |
| 2009/0092236 A1 | 4/2009 | Wilson |
| 2009/0262962 A1* | 10/2009 | Iwasaki .................. H04R 3/12 |
| | | 381/300 |
| 2010/0197218 A1 | 8/2010 | Watanabe |
| 2010/0260247 A1 | 10/2010 | Albiston et al. |
| 2014/0176348 A1 | 6/2014 | Acker |
| 2015/0049876 A1 | 2/2015 | Kim et al. |
| 2017/0068423 A1* | 3/2017 | Napolitano ...... H04N 21/42203 |
| 2018/0167672 A1* | 6/2018 | Cannistraro ......... H04N 21/485 |
| 2018/0234551 A1 | 8/2018 | Cannata |

\* cited by examiner

METHOD OF CONTROLLING COMMUNICATIONS WITHIN A DIGITAL INTERCOM SYSTEM

CROSS REFERENCE TO RELATED APPLICATIONS

This application is a divisional of co-pending U.S. patent application Ser. No. 15/894,254 filed Feb. 12, 2018, entitled "METHOD OF CONTROLLING COMMUNICATIONS WITHIN A DIGITAL INTERCOM SYSTEM", which in turn claims priority to and the benefit of U.S. Provisional Patent Application No. 62/457,426, filed on Feb. 10, 2017 and titled "DIGITAL INTERCOM SYSTEM AND METHOD", the contents of which are incorporated herein by reference as though fully set forth herein. Further, this application is related to U.S. patent application Ser. No. 15/894,359, filed on Feb. 12, 2018 and titled "BROWSER BASED DIGITAL INTERCOM SYSTEM", the contents of which are incorporated herein by reference as though fully set forth herein.

FIELD OF THE INVENTION

The subject disclosure relates to communication systems and more particularly to intercom systems designed for harsh environments.

BACKGROUND OF THE INVENTION

Intercom systems are useful in environments in which a group of users communicate with each other. For example, in a firefighting environment, it is important that individual firefighters be able to communicate reliably with each other over a full-duplex system. It is also important that command personnel on the scene of a fire be able to communicate with the individual firefighters. It is also important that persons at a remote location, such as a fire department dispatch location or headquarters be able to communicate. Intercom systems are commonly used to provide this functionality.

Marine vessels can also be environments in which intercom communication can be employed. It is often desirable for members of a large boat crew to be able to communicate with each other during operation. Intercom systems are also commonly used to provide this functionality as well.

It is desirable to be able to configure communication among members of a group of users of an intercom system according to a particular operational scenario or a particular tactical situation. Similarly, it is also desirable to make adjustments to the communication configuration in real time ("on the fly") to be able to manage communication between a number of different devices.

SUMMARY OF THE INVENTION

In light of the needs described above, there is a need for a digital intercom system that allows communication between numerous devices to be easily and intuitively managed.

In at least one aspect, the subject technology relates to a digital intercom system. The system includes a master station having hardware and software configured to allow duplex communication between a plurality of communication devices. The software runs a plurality of settings for directing communication between the communication devices. The master station is configured to modify the settings based on input entered into a browser based program run on an input/output (I/O) device by a user.

In some embodiment, the master station includes the I/O device. The master station can have a port for selectively connecting the I/O device to the master station. The master station can include memory for storing the browser based program. Further, the master station can be configured to allow the I/O device to: download a copy of the settings from the memory; upload new modified settings from the I/O device; and store the new modified settings in the memory. In some cases, the master station is configured to upload the browser based program to a server to allow the I/O device to modify the settings by accessing the browser based program from the server. In some embodiments, the communication devices include a wired endpoint hardwired to the master station. The wired endpoint can also be hardwired to a headset.

In some embodiments, the system can include one or more wireless gateways, each wireless gateway hardwired to the master station and in wireless communication with at least one of the communication devices. The at least one communication device in wireless communication with a wireless gateway can also include a headset hardwired to a belt station, the belt station forming a wireless connection between said communication device and said wireless gateway. In some embodiments, the settings include a plurality of channels for each communication device, the channels each having an option set defining parameters for dictating how the communication devices within the system will communicate. The belt station can include a single soft button operable to cycle between channels associated with the communication device hardwired to the belt station.

In some embodiments, at least one of the communication devices provides an audio prompt when a user switches between channels. The settings can include a plurality of channels for each communication device, the channels each having an option set defining parameters for dictating how the communication devices within the system will communicate. In some embodiments, the parameters further dictate, for each communication device: which other communication devices said communication device will be in communication with; and when said communication device will send and receive audio to and from the other communication devices. Each communication device can include at least one soft button operable to change between the channels. The soft buttons can include a plurality of select buttons, activating one of the select buttons causing said communication device to switch from an active channel to a separate channel. The soft buttons can include a switch button, activating the switch button causing a corresponding communication device to change the channels associated with each select button for said communication device. In some cases, the switch button can be a push to talk button, activating the push to talk (PTT) button allowing input audio from the device associated with said PTT button to be sent to at least one other communication device.

In at least one aspect, the subject technology relates to a method of managing communications between a plurality of communication devices within a digital intercom system. An input table is provided for each communication device. The input table has a plurality of first linear arrays each corresponding to a different one of the communication devices on the system. The input table also includes a plurality of second linear arrays each corresponding to a communication channel. The input table also has a plurality of cells each defined by an associated one of the first linear arrays and an associated one of the second linear arrays, the cells containing volume control information for communication with the communication device corresponding to the associated first linear array and over the communication channel corresponding to the associated second linear array. An output table is also provided for each communication device. The output table has a plurality of third linear arrays each corresponding to a different one of the communication devices on the system. The output table also has a plurality of fourth linear arrays each corresponding to a communication channel. The output table also has a plurality of cells each defined by an associated one of the third linear arrays and an associated one of the fourth linear arrays, the cells containing volume control information for communication with the communication device corresponding to the associated third linear array and over the communication channel corresponding to the associated fourth linear array. The method includes receiving, from a first communication device of the communication devices, an audio transfer request to send an audio signal to a second communication device of the communication devices. A first active channel of the first communication device is identified from the communication channels. A second active channel of the second communication device is identified from the communication channels. A first cell of the cells of the input table of the first communication device is identified, the first cell defined from a first linear array corresponding to the second communication device and a second linear array corresponding to the first active channel. A second cell of the cells of the output table of the second communication device is identified, the second cell defined from a third linear array corresponding to the first communication device and a fourth linear array corresponding to the second active channel. The volume control information of the first cell is compared with the volume control information of the second cell. The audio signal is modified based on the comparison of the volume control information of the first cell and the volume control information of the second cell.

In some embodiments, the audio signal is processed to compare a noise level within the audio signal to a voice level within the audio signal. The audio signal from the first communication device can then be transferred to the second communication device if the voice level is greater than the noise level. In some cases, the method further includes transferring the audio signal from the first communication device to the second communication device. The communication channels can be configured from a master station connected to all the communication devices by Ethernet.

In some embodiments, volume control information in the first and second cells can include a suggested volume. In some cases, a smallest suggested volume can be determined based on the comparison of the volume control information of the first cell and the volume control information of the second cell. In the step of modifying the audio signal, the audio signal can then be modified based upon the smallest suggested volume. In some embodiments, the active channel for each communication device is set locally on the communication device. Each communication device can include at least one button, the active channel for the communication device being set by activating one of the buttons. In some embodiments, the cells of the input tables are each formed from intersections between the first linear arrays and the second linear arrays such that the input tables are multidimensional arrays. The cells of the output tables can be formed from intersections between the third linear arrays and the fourth linear arrays such that the output tables are multidimensional arrays.

In at least one aspect, the subject technology relates to a method of managing communications between a plurality of communication devices within a digital intercom system. The method includes providing an input table for each communication device. The input table includes a plurality of rows each corresponding to a different one of the communication devices on the system. The input table also includes a plurality of columns each corresponding to a communication channel of a plurality of communication channels, the columns defining parameters dictating how the communication devices within the system will communicate. The input table also includes a plurality of cells each defined by an associated row and an associated column of the input table, the cells containing volume control information for communication with the communication device corresponding to the associated row and over the communication channel corresponding to the associated column. Further, an output table is provided for each communication device. The output table has a plurality of rows each corresponding to a different one of the communication devices on the system. The output table also has a plurality of columns each corresponding to one of the communication channels. The output table also has a plurality of cells each defined by an associated row and associated column of the output table, the cells containing volume control information for communication with the communication device corresponding to the associated row and over the channel corresponding to the associated column. An audio transfer request is received from a first communication device of the communication devices to send an audio signal to a second communication device of the communication devices. A first cell is identified from the cells of the input table of the first communication device, the first cell defined by a row corresponding to the second communication device and a column corresponding to an active channel of the communication channels of the first communication device. A second cell is identified from the cells of the output table of the second communication device, the second cell defined by a row corresponding to the second communication device and a column corresponding an active channel of the communication channels of the first communication device. The volume control information of the first cell is compared with the volume control information of the second cell. The audio signal is modified based on the comparison of the volume control information of the first cell with the volume control information of the second cell.

In some embodiments, the audio signal is processed to compare a noise level within the audio signal to a voice level within the audio signal and the audio signal is transferred from the first communication device to the second communication device if the voice level is greater than the noise level. In some cases, the audio signal from the first communication device is transferred to the second communication device. In some embodiments the communication channels are configured from a master station connected to all the communication devices by Ethernet. Each communication device can include at least one button, the active channel for the communication device being set by activating one of the buttons. In some embodiments, the volume control information can include a suggested volume. A smallest suggested volume can be determined based on the volume control information of the first cell and the volume control information of the second cell and the audio signal can be modified based upon the smallest suggested volume.

In at least one aspect, the subject technology relates to a method of managing communications between a plurality of communication devices within a digital intercom system. An input table is provided for each communication device, the input table having a plurality of cells containing volume control information for communication with other communication devices within the system. The cells within the input table are catalogued at a location corresponding to: one of the other communication devices; and one of a plurality of communication channels. For each communication device, an output table is provided with a plurality of cells containing volume control information for communication with other communication devices within the system. The cells are catalogued within the output table at a location corresponding to: one of the other communication devices; and one of a plurality of communication channels. Input audio is received by a first communication device of the communication devices. A voice level and a noise level are identified from the input audio. When the voice level is greater than the noise level, additional steps are taken. The additional steps include generating an audio transfer request to send an audio signal from the first communication device to a second communication device of the communication devices, the audio signal based on the input audio. The additional steps also include retrieving the input table of the first communication device and the output table of the second communication device. The additional steps also include identifying a first active channel of the first communication device from the communication channels. The additional steps include identifying a second active channel of the second communication device from the communication channels. The additional steps also include modifying the audio signal of the audio transfer request based on a comparison of the volume control information of the first cell with the volume control information of the second cell.

In some embodiments, the method includes transferring the audio signal from the first communication device to the second communication device.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
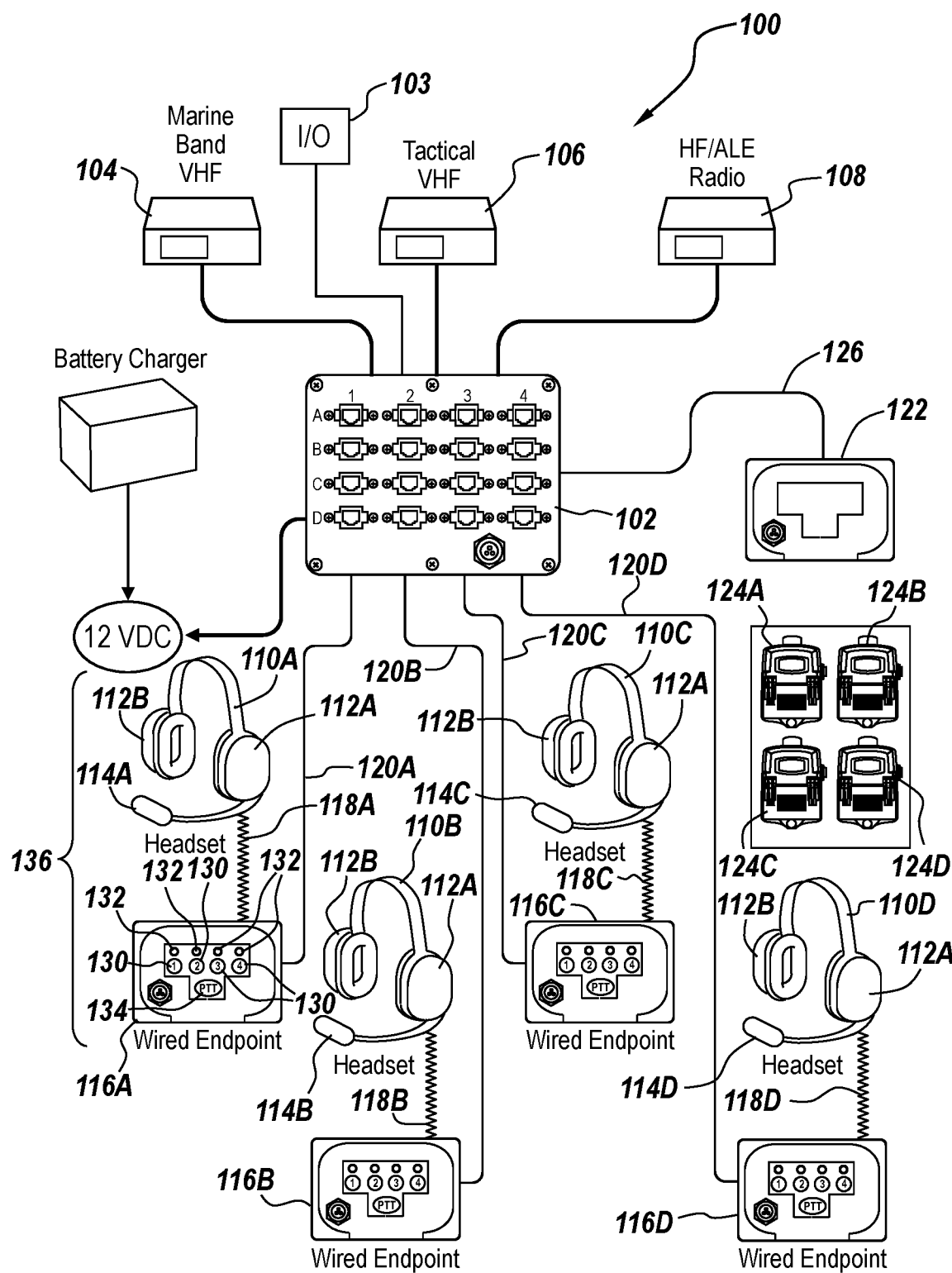
FIG. 1 is a schematic block diagram of components of a digital intercom system in accordance with the subject technology.

The subject technology overcomes many of the prior art problems associated with intercom systems. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top). Further, numbered components (e.g. first, second, and third devices) are used just for clarity and are not meant to denote any specific order or configuration of the components.

Figure 2:
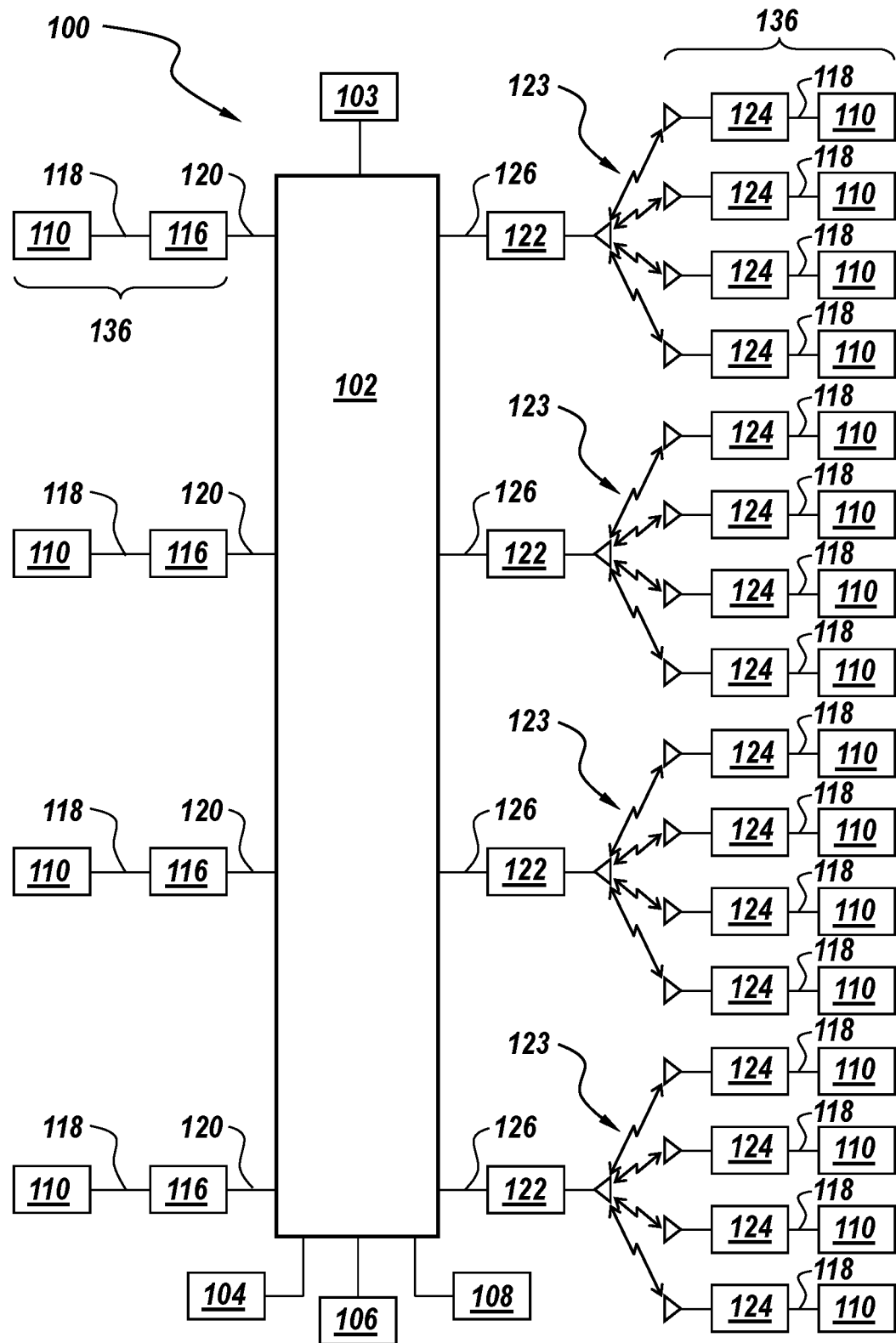
FIG. 2 is a block diagram of components of a digital intercom system in accordance with the subject technology.

Referring now to FIGS. 1 and 2, schematic functional block diagrams which illustrate components of a digital intercom system 100 according to exemplary embodiments are shown. System 100 illustrated in FIGS. 1 and 2 can be implemented in any environment in which intercom systems are useful or desirable, including but not limited to firefighting, marine vessels, aircraft ground support, or the like. System 100 can be implemented as a stand-alone system, or, alternatively or additionally, in a structure with existing wiring, such as Category 5 digital communication wiring, or other similar wiring.

Still referring to FIGS. 1 and 2, digital intercom system 100 includes a master station 102, which performs as a system hub and controls communications between all of the system components. Generally, master station 102 includes hardware and software configured to control communication between a plurality of communication devices 136. Master station 102 can include one or more analog and/or digital inputs and/or outputs, and/or control inputs/outputs. Master station 102 can also provide interfaces for communication with external communication devices, such as, for example, a marine-band very high frequency (VHF) radio 104, a tactical VHF radio 106 and/or a high-frequency/automatic link establishment (HF/ALE) radio 108. These radio devices 104, 106, 108 can communicate with the master station 102 (and thus with other devices within the system 100) from long distances. Settings controlling communication between communication devices 136 can be set at the master station 102 using an input/output (I/O) device 103. The I/0 device 103 can be a part of the master station 102 (e.g. a keyboard, mouse, and computer screen attached to the master station 102) or an external device. In the case where the I/O device 103 is an external device, the settings can be modified on the I/O device 103 which can then be connected (via hardwire or wirelessly) to the master station 102 to upload the modified settings onto the master station 102.

In system 100 of FIGS. 1 and 2, individual users communicate with each other through communication devices 136 which are all linked to the master station 102. The communication devices 136 typically include an audio I/O device, such as headsets 110A-D (generally 110), and an endpoint or gateway for sending signals between each communication device 136 and the master station 102. In the example of FIGS. 1 and 2, headsets 110 include an audio output by which the user can hear communications from other users and a microphone by which the user can provide his/her own communications to other users. It will be noted that system 100 is illustrated and described in FIG. 1 as including four headsets 110. However, the present disclosure is applicable to intercom systems with any number of headsets. The audio output of each headset 110A-D can be of the form of a pair of headset domes 112A and 112B, which surround the ears of the user of the headset 110. Each headset dome 112 includes a speaker for providing audio output for the user to hear. It will be understood that the type of headsets 110 illustrated in FIG. 1 is exemplary only. Other configurations of headsets 110, or other I/O devices, can be used in the technology of the present disclosure. For example, any or all of the headsets 110 can be an intra-aural headset, a helmet-type headset, or other type of headset 110. One or more of headsets 110 can be, for example, noise attenuating headsets with a noise-cancelling boom-mounted microphone 114A-D. Headsets 110 can include individual volume adjustment and radio push-to-talk (PTT) capability. Headsets 110 can be any of the type manufactured and sold by the present Applicant, David Clark Company Incorporated of Worcester, Mass., USA.

In some cases, some of the communication devices 136 include wired endpoints 116A-D (generally 116) which are hardwired to the master station 102 to facilitate the transmission and receipt of audio signals between the headset 110 and master station 102. The headsets 110 can be hardwired to the wired endpoints 116 by coil cords or cables 118A-D (generally 118). Each wired endpoint 116 provides the interface between a headset 110 and the master station 102. In some exemplary embodiments each wired endpoint 116 includes a user interface including five "soft buttons" (software definable buttons) operable by the user to control their interaction within system 100. The five soft buttons include four programmable select buttons 130 labeled "1," "2," "3" and "4" with corresponding multi-color LEDs 132 and a fifth switch button 134. In general, options for communicating on the system are configured at the master station 102 for each device and activating the buttons 130, 134 switches the option settings of that communication device 136. This changes the communication between that communication device 136 and the other communication devices 136 within the system 100, as discussed in more detail below. For example, activating the select buttons 130 can allow a user to select a new communication channel, changing the parameters under which the corresponding communication device 136 is currently operating (i.e. the active channel of the communication device 136). In this way, activating the select button 130 can change which other communication devices 136 are heard. In some cases, activating a select button 130 causes a communication device 136 to cycle through communication channels within different talk groups, such as a radio/public address (PA) or intercom talk-group, as discussed in more detail below.

In the embodiment shown in FIG. 1, the switch button 134 is configured as a push-to-talk (PTT) button. Activating the switch button 134 will allow input audio into a corresponding headset 110 to be transmitted to one or more select communication devices 136 within the system 100, depending on the activate channel of the communication device 136 and the settings associated with the switch button 134. However, the example of a PTT-type switch button 134 is given only in way of example and for consistency with familiar convention in the intercom industry. The switch button 134 is programmable to implement various features, such as talk-group channel selection, radio, PA, etc., similar to the other four soft buttons 130. Alternatively, the switch button 134 can be configured effectively as a "shift" button, such that activating the switch button 134 changes the option sets (e.g. the channels) associated with each select button 130. Therefore activating a select button 130 which previously activated a first channel may instead cause the same select button 130 to activate a second channel after the switch button 134 is activated. In such a case, activating one of the select buttons 130 will result in the communication device 136 communicating within the system 100 operating under a different set of parameters before and after the switch button 134 is activated. It will be understood that any number of software-definable buttons can be used in various embodiments.

Still referring to FIGS. 1 and 2, each wired endpoint 116A-D is connected to master station 102 by a cable 120A-D (generally 120). Cables 120 carry the appropriate analog and/or digital signals to implement audio communications between user headsets 110A-D on system 100. For example, cables 120 can carry digital audio signals from master station 102 which are used to drive the audio output of each headset 110A-D to permit the user at each headset 110 to hear communications on system 100. Cables 120 can carry digital audio microphone signals from each headset 110 and/or wired endpoint 116 to master station 102 such that each user can be heard on system 100 as desired. Cables 120 can also carry digital control signals back and forth between the wired endpoints 116 and master station 102 to control which communication devices 136 are in communication based on the set options of each communication device 136. Cables 120 can be electrically conductive, comprising a material such as copper or aluminum. Alternatively, cables 120 can be optical fibers.

In some exemplary embodiments, intercom system 100 can implement a wireless feature. That is, in some embodiments, instead of or in addition to cables 120 connecting wired endpoints 116 to master station 102, one or more wireless gateways 122 can be connected to the master station 102 to provide wireless, full-duplex communication to remote communication devices 136. In these embodiments, a plurality of wireless belt stations 124 can be used, each belt station 124 being carried or worn by a user of system 100. Each belt station 124 is paired with an audio I/O device, such as a headset 110, to form a communication device 136. The corresponding headset 110 can be connected to each wireless belt station 124 by a coil cable 118. Each wireless belt station 124 transmits and receives signals wirelessly to and from a wireless gateway 122 via a wireless communication channel 123. The master station 102 is hardwired to the wireless gateways 122 by cables 126, the cables 126 carrying digital audio and control signals between the master station 102 and the wireless gateways 122. Cables 126 can be electrically conductive, comprising a material such as copper or aluminum. Alternatively, cables 126 can be optical fibers. Cables 126 can carry the appropriate digital signals to implement audio communications from communication devices 136 on system 100. Signals provided to the wireless gateways 122 can then be transmitted via wireless communication channels 123 to the wireless belt stations 124, the belt stations 124 providing a signal to the corresponding headset 110 via coil cables 118 to drive the audio output of the corresponding headset 110. In this way, the wireless gateways 122 facilitate the communication between remote communication devices 136 and other communication devices connected (by hardwire or wirelessly) to the master station 102. Notably, the term "belt station" is used generally to refer to devices which function as described herein, transmitting and receiving wireless signals between a remote wireless endpoint and a local audio I/O device, and is not meant to be construed restrictively.

Wireless communication channels 123 between each belt station 124 and the wireless gateways 122 can be implemented in accordance with an appropriate wireless communication protocol, such as, for example, Digital Enhanced Cordless Communication (DECT) 6.0, or other DECT version, or other wireless communications protocol. Wireless gateways 122 provide a close-proximity wireless link (i.e. a wireless communication channel 123) and wireless connection for each headset 110 user on system 100 via a wireless belt station 124. Wireless gateways 122 act as relays for the audio of all wireless users on system 100, including intercom and radio transmit/receive functions between master station 102 and all wireless users on system 100. As noted above, each belt station 124 transmits and receives system 100 audio (i.e. intercom and radio communication) to and from master station 102 and therefore to various user's headsets 110. In some particular exemplary embodiments, each wireless belt station 124 provides line-of-sight reliable range from a wireless belt station 124 to a wireless gateway 122. The wireless belt stations 124 can provide functionality such as talk group selectability, automatic VOX adjustment for hands-free, full-duplex communication, microphone control switch, multi-function momentary PTT switch, radio/configuration select, water-tight connection for headset connector, attachment (wired) option, removable Lithium polymer battery for at least 24 hours of continuous usage on a single charge, and other operational features. For example, as with the wired endpoints 116, the wireless gateways 124 can include one or more soft buttons 130, 134. In some cases, rather than having numerous soft buttons, the belt stations 124 each include a single soft button which can be activated to change between a plurality of different channels or option sets. After the button is activated, a corresponding audio output can play through the headset 110 to tell the user which channel they have switched to, or alternatively, to inform them that they have switched channels. In some embodiments, the single soft button can also be a power button for the belt station 124, the soft button powering the belt station 124 on or off when held for an extended period of time (e.g. 2 or more seconds) and cycling between option sets when activated more briefly (e.g. less than 2 seconds).

As illustrated in the particular exemplary embodiments of FIGS. 1 and 2, each wireless gateway 122 can provide wireless communication 123 to up to four belt stations 124. As a result, in the particular exemplary system 100 illustrated in FIGS. 1 and 2, master station 102 can control wireless communication among up to sixteen user headsets 110.

In some exemplary embodiments, master station 102 also provides the power source for all wired endpoints 116, which can serve as headset stations for the headsets 110, and all wireless endpoints (i.e. wireless gateways 122). Master station 102 is configured to allow installation of multiple functional add-in modules, thus allowing users to configure connections on system 100 based on their specific requirements, i.e., headset stations (wired endpoints 116), wireless endpoints (wireless gateway 122), radios 104, 106, 108, interfaces, auxiliary input/output, etc. One type of add-in module, referred to herein as a "switch card" add-in module, provides connection points for multiple, e.g., up to four, wired or wireless endpoints. In some embodiments, power-over-Ethernet provides power to endpoints. Another type of add-in module, referred to herein as a "radio card" add-in module, provides multiple connection points, e.g., up to four, for two-way radio connections. Alternatively, the radio card add-in module can provide, for example, four analog connections for example, for two radio and two stereo/mono audio devices, e.g., weather receiver, GPS navigation device, etc.

Figure 3:
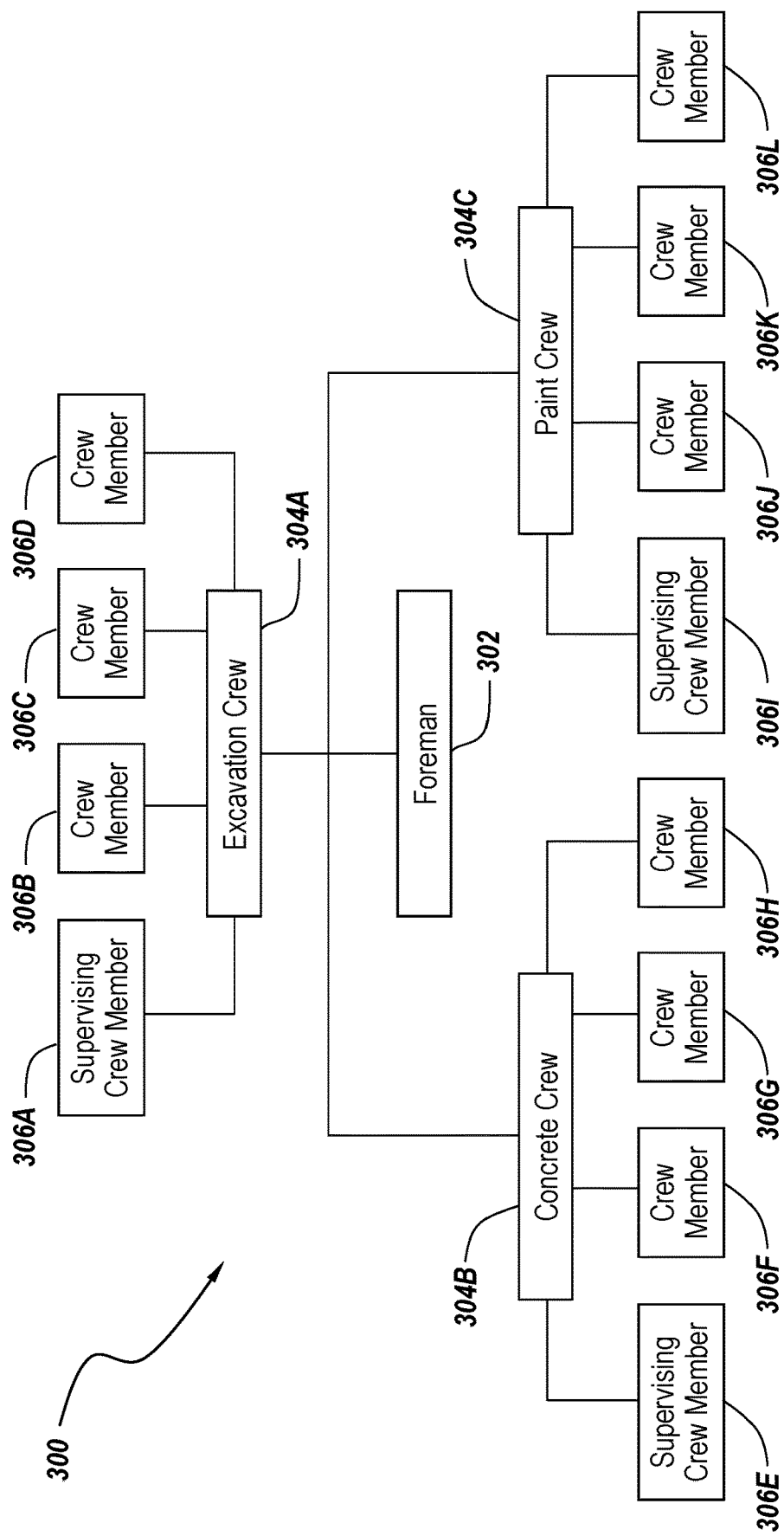
FIG. 3 is a block diagram illustrating communication between users of a digital intercom system in accordance with the subject technology.

Referring now to FIG. 3, a block diagram 300 is provided to illustrate an example of communication between users using communication devices 136 on the system 100 in accordance with the subject technology. In the example of diagram 300, the system 100 is being used by a construction crew on a construction project. However, as noted, the system 100 is also well suited for use in many other environments, including harsh environments, such as in marine or high speed flight applications. The construction crew includes a foreman 302 who is in communication with an excavation crew 304A, a concrete crew, 304B, and a paint crew 304C (collectively 304). Each crew 304 includes a number of crew members 306A-306L (generally 306). Four crew members 306 are shown in each crew 304 for exemplary purposes. Each crew member 306 and the foreman 302 all have communication devices 136 which are connected to the same intercom system 100. Settings for the communication devices 136 are configured at the master station 102. The settings include parameters which dictate how the communication devices 136 will communicate. Preferably the parameters are contained within option sets with a number of option sets corresponding each device 136. The user of a device 136 can switch between option sets by switching channels. For example, the first channel may be a default option set allowing all users 302, 306 to hear one another with priority being given to the foreman 302. Therefore when the foreman 302 talks, the other crew members 306 will have their volume lowered or muted. Further, each crew 304 may have a supervising crew member (e.g. crew member 306A, 306E, 306I) who has priority over the other members of the crew 304, but not the foreman 302. Switching to a second channel may activate a second option set which changes the first option set to place the entire excavation crew 304A under "push-to-talk" ("PTT") conditions. In this case, the excavation crew 304 will be generally muted and will only be heard when they activate a soft button (e.g. a switch button 134) on their communication device 136. Said differently, activating the soft button switches the active option set for their communication device 136 (e.g. from the default channel option set to a subset option set) such that audio input into the corresponding headset 110 which was previously blocked is instead heard by the other crew members 304 and foreman 302. In this way, when the excavation crew 304A is in the process of excavating, the other workers don't constantly hear the noise from the excavation through their communication device 136, but instead, only hear the excavation crew 304A when one of the excavation crew members 306A-306D has activated the soft button enabling PTT. Similarly, if the noise of the excavation is only captured in the headset 110 of one member of the construction crew (e.g. if crew member 306B is a backhoe operator), a channel can be included with an option set that puts only that crew member (member 306B) on a PTT setting. By further way of example, additional option sets three and four (or channels) might implement similar restrictions, adding a push-to-talk condition to the concrete and paint crew 304B, 304C respectively. Notably, these possible channels and option sets are merely examples. Channels, option sets, or groups of option sets can be configured as desirable to cause one or more users to have input and/or output capability with one or more other users and/or to impose restrictions on audio exchanged between users. Different option sets can be configured within the settings from the master gateway 102 as desired, as discussed in more detail below.

In further detail, the communication devices 136 of each user include one or more soft buttons which allow them to then cycle through the option sets and/or switch channels. For example, the soft buttons can include four select button 130 which allow the user to switch through the various channels and a switch button 134 which changes the options set within each channel. A first communication device 136 might then be held by the supervising crew member 306A of the excavation crew 304A. Activating a first select button 130 may change the active channel of the communication device 136 of the supervising crew member 306A such that he can only hear the concrete crew 304B and the foreman 302. While in some examples the switch button 134 acts as a PTT button, switching the current option set to one where the associated communication device 136 is no longer muted, the switch button 134 can also be used to switch the option sets in other ways. For example, the switch button 134 can effectively act as a shift, changing the associated option sets of each select button 130. In this way, while four channels corresponding to four option sets may initially be accessed by activating one of the four select buttons 130, an additional, different four channels having different corresponding option sets may be accessed once the switch button 134 has been activated. Therefore after activating the switch button 134, activating a first select button 130 will access a fifth option set while activating a second select button 130 will access a sixth option set and so on. The switch button 134 can also change the active device channel. For example, if the first select button 130 of the above example has already been activated and the switch button 134 is then activated, the device will switch from relying on the first option set and will instead rely on the fifth option set. In some cases, the switch button 134 can be activated numerous times to switch between additional option sets for each select button 130. The soft buttons can also include a select button 130 which allows "direct talk", activating the select button 130 allowing the user to talk to or hear from a specific person within the system 100 (e.g. the foreman 302) without that person needing to press anything.

Figure 4:
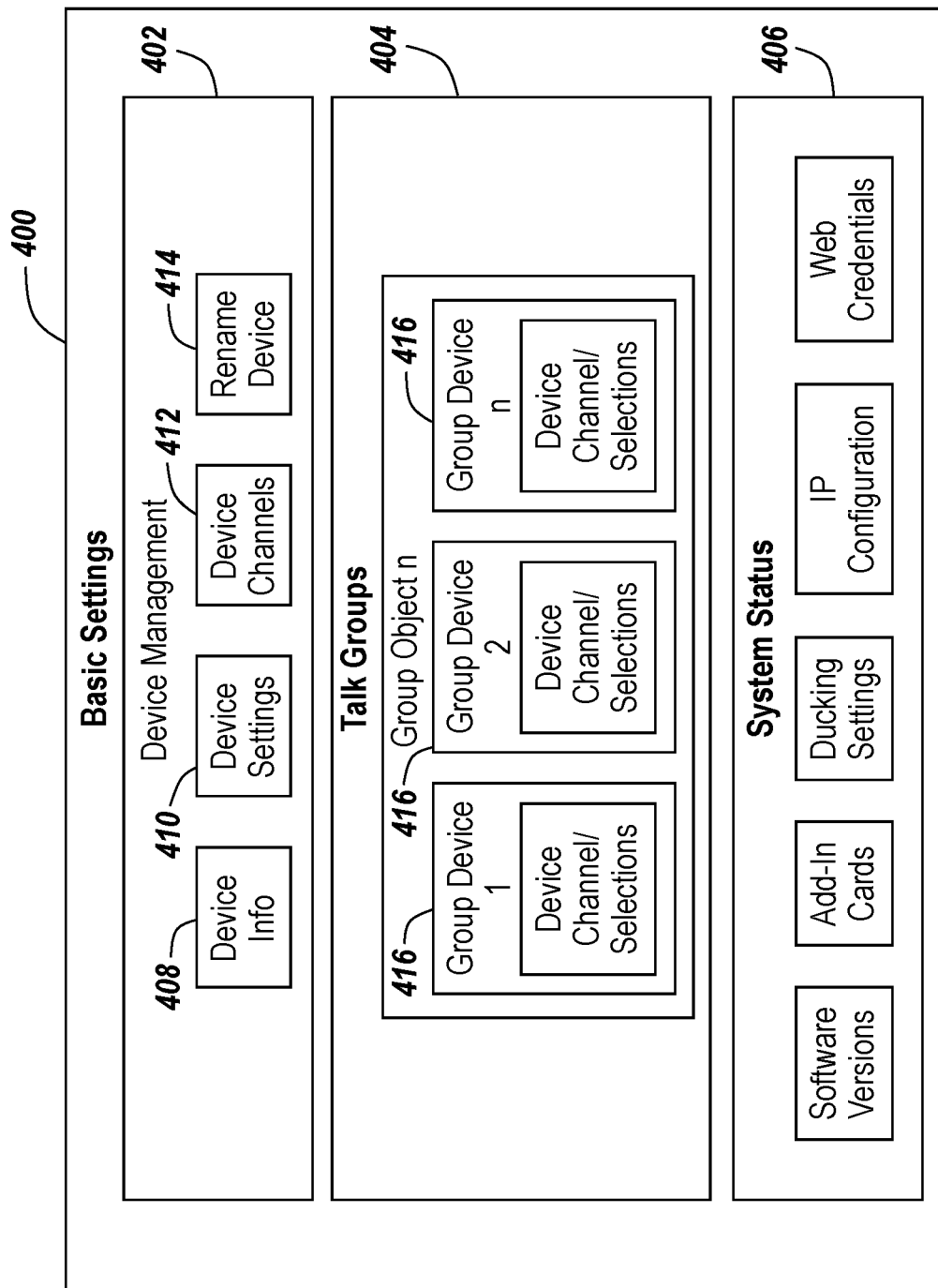
FIG. 4 is a graphical user interface generated by a browser based program in accordance with the subject technology.

Referring now to FIG. 4, a graphical user interface ("GUI") generated by a browser based program in accordance with the subject technology is shown generally at 400. The GUI 400 allows a user to view or modify the system 100, and more particularly the settings and options of communication devices 136 and associated communication channels within the system 100, from a central location. The GUI 400 can be produced by an output device attached directly to the master station 102, or can be produced on an external device that is connected to the master station 102, such as a laptop. The GUI 400 can be produced by an HTML program which is run within a web browser. The GUI 400 allows a user to modify settings stored within the memory of the master station 102 which control communication between devices 136 on the system 100. In some cases, the GUI 400 can be accessed on a website, changes made to the GUI 400 by an external device via the web page being presented to the master station 102. In any case, changes made to the settings via the GUI 400 are eventually stored with the memory of the master station 102 to control communication between the devices 136 on the system 100.

The GUI 400 displays a number of selections related to communication device management 402, talk group options 404, and system status 406. Under the device management 402 section, the various communication devices 136 which are part of the system 100 will be identified and described when the device info block 408 is selected. The other selections allow the user to edit settings associated with the communication devices 136 (block 410), review channels within which each communication device 136 communicates (i.e. the option sets between devices block 412), or rename communication devices 136 as desired (block 414).

The GUI 400 also presents "talk group" options 404. The talk group options 404 provide an easy interface for a user to modify the channels within which each communication device 136 communicates. For example, each communication device 136 can have one or more option sets associated with that communication device 136 which might be accessible by activating buttons on the communication devices 136. Within the talk group options 404, individual talk groups 416 can be configured to assign one or more communication devices 136 to that particular talk group 416. After creating and naming a talk group 416, the operator, operating through the GUI 400, can assign a number of communication devices 136 connected to the system 100 to that talk group 416 and assign parameters for how the buttons of each communication device 136 will affect communication between the devices 136. The operator can modify the options related to each communication device 136 within that talk group 416.

For example, a first communication device 136 with a wireless or wired endpoint and corresponding headset 110 can be included within the talk group 416. The options of that communication device 136 can be set to hear all audio from other communication devices 136 within that talk group 416, to hear no audio, or at some intermediate level. Likewise, the communication device 136 can be set to allow transmission of audio through a microphone or other means, or to allow no transmission of audio. In some cases, it may be desirable to set options for the first communication device 136 such that audio is transmitted only under certain conditions, such as when a PTT button is activated, or when the device 136 is on a certain channel. This can be particularly advantageous in a harsh environment and/or an environment with significant background noise. Other communication devices 136 can then be added to the talk group 416 and have their settings likewise configured. Audio ducking can be specified to allow particular communication devices 136 to have priority over other devices 136 within the talk group 416 such that one or more communication devices 136 are muted when a certain communication device 136 is receiving input audio (e.g. when the user of that device 136 is speaking). Similarly, outside audio could be provided to the users in the talk group 416, for example, from an outside radio source. The outside audio source could then be muted whenever audio is received through one of the communication devices 136 within the talk group 416.

In way of further example, all communication devices 136 within a talk group 416 can share similar settings, or alternatively, communication devices 136 within a talk group 416 can have settings tailored to the expected user of that communication device 136 (e.g. the foreman's communication device 136 has different settings from those of crew members). The GUI 400 will display specific names for each talk group 416 which a user can modify (e.g. "excavation crew" or just "group 1"). This allows for the operator of the GUI 400 to see a straight forward and intuitive visual representation of the options for various communication channels between the devices 136. These groups 416 can be set or modified by the user by inputting data into the master station 102 based on what the operator sees on the GUI 400. Setting up numerous talk groups 416 can be advantageous to allow easy switching between several different modes and/or to specify communication across the system 100, as discussed in more detail below. Notably, while communication devices 136 are used by way of example, it should be understood that other types of communication devices can be included within the talk groups 416 and systems 100, such as communication devices connected to the system 100 via a radio link for example.

Figure 5A:
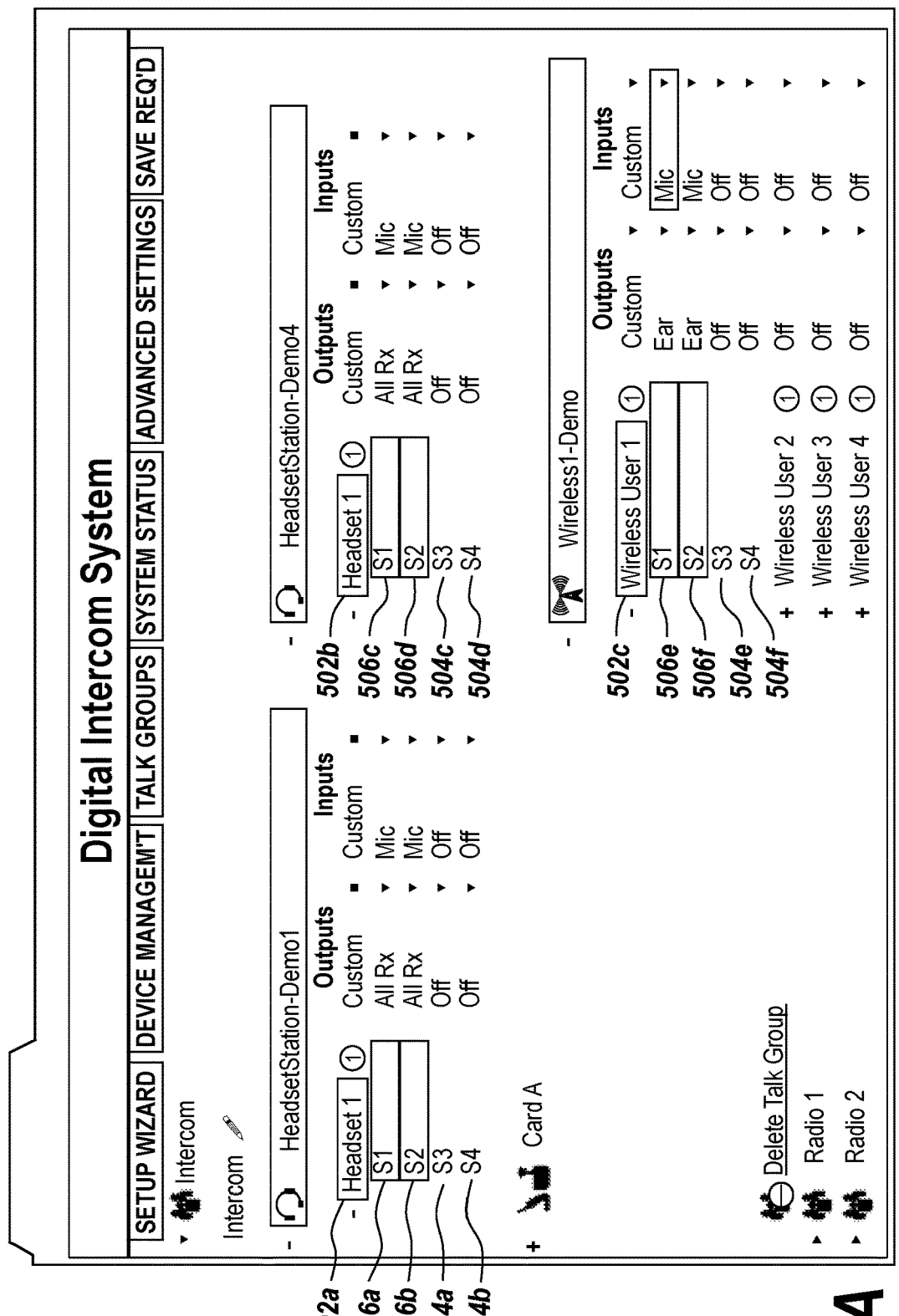
FIGS. 5A-5C are sample interfaces allowing a user to modify settings on the digital intercom system in accordance with the subject technology.
Figure 5B:
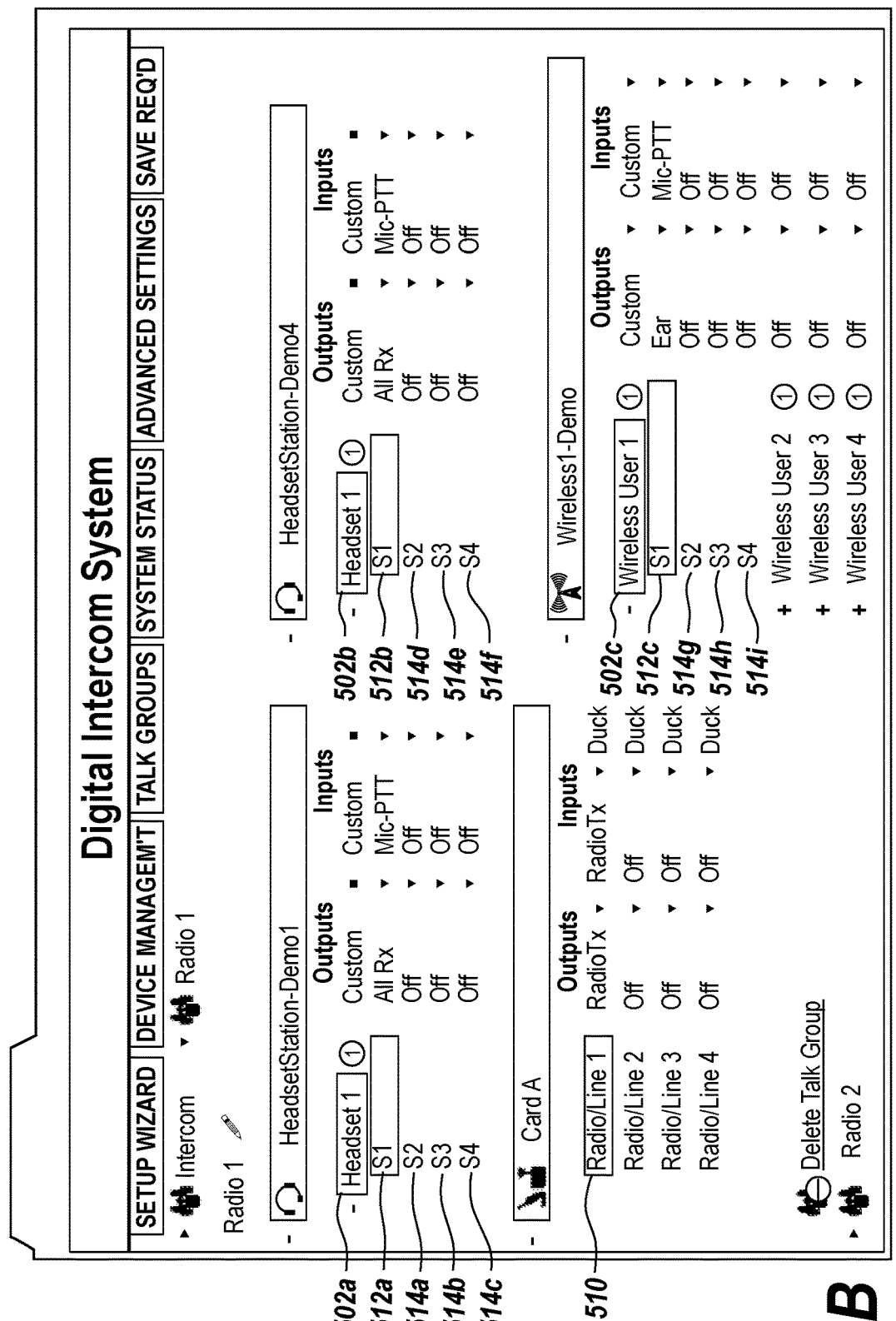
Figure 5C:
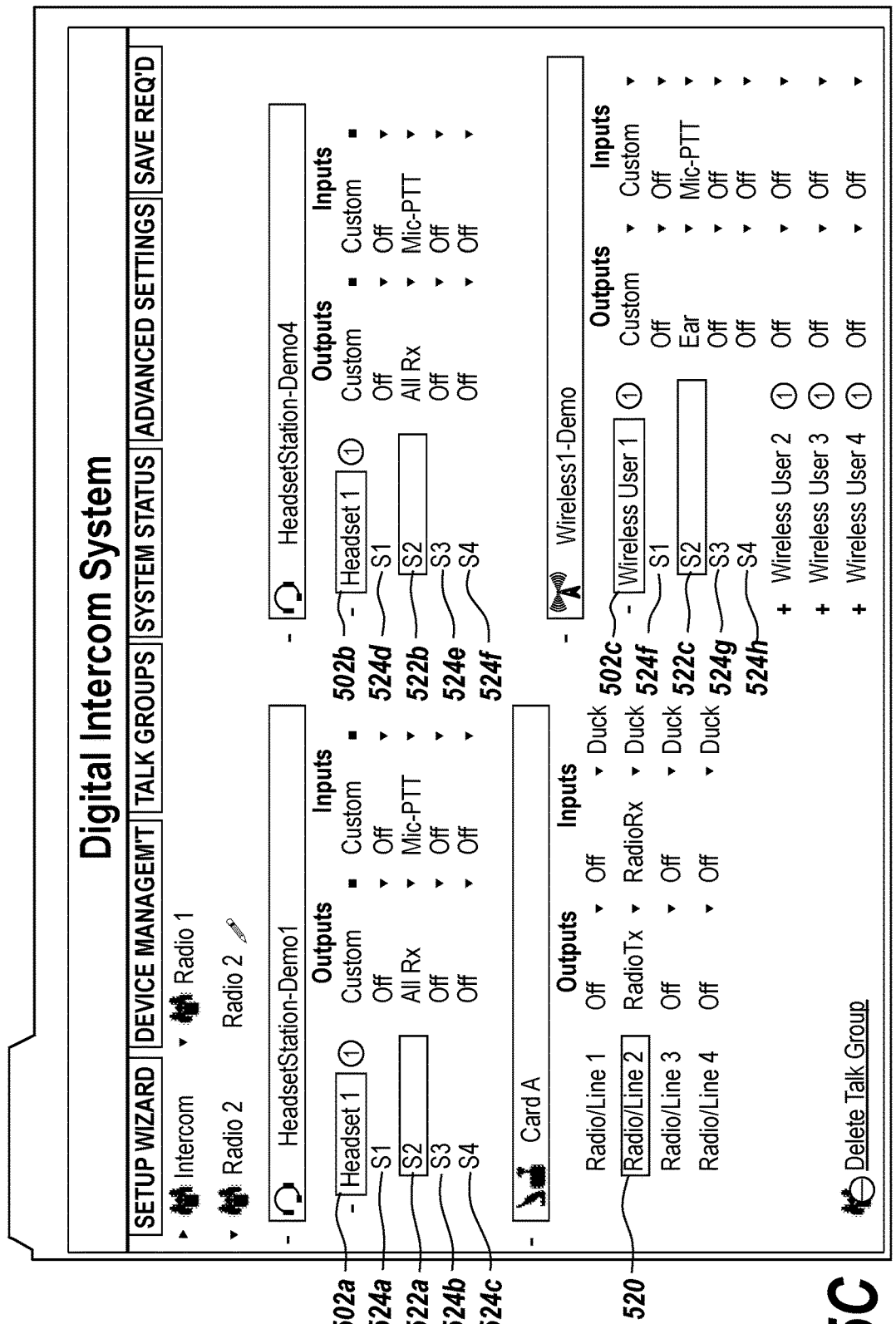

Referring now to FIGS. 5A-5C, sample interfaces for setting up a talk group in accordance with the subject technology are shown at 500*a*, 500*b*, 500*c* (generally 500). The interfaces 500 allow the operator of the master station 102 to edit the settings which dictate communication between the communication devices 136. In some cases, the interfaces are presented to the user via a GUI on an output device attached directly to the master station 102 and the user can edit the settings using an input device attached to the master station 102. The output device can be a screen, such as a computer monitor, and the input device can be a mouse and keyboard, buttons, touch screen, or the like. In other embodiments, modifications can be made on an external device with input/output capability and the ability to run the interfaces 500. For example, the system 100 settings and the software for running the interfaces 500 can be transferred to a laptop, or put on a flash drive such that the interfaces 500 can be accessed from an external device. Alternatively, interfaces can be based on HTML code and the master station 102 can upload the interfaces 500 on the Internet or on a server to allow the external device to access the interfaces 500 and modify the settings by opening the interfaces 500 on a web browser. Once modifications have been made to the settings using the interfaces 500 (e.g. specific talk groups set up and/or option sets for various communication devices 136 changed), the modified settings can be stored within the memory of the master station 102 for implementation on the system 100 as needed.

The sample interfaces 500 represent an example format of how data is presented to the user to allow them to modify the underlying settings of the master station. Referring to FIG. 5A, the user has created a talk group and named it "Intercom". The Intercom group includes blocks which relate to three communication devices 502*a*, 502*b*, 502*c* created by the user within the system 100. Each device 502 has four different channels, the different channels being generally accessible by soft buttons on each communication device 502. Each channel S1-S4 has different input and output option sets associated with a particular communication device 502. The user can also add additional communication devices which are connected to the master station 102 (by hardwire or wirelessly). The S1 and S2 channels for each device 502 are shown as being configured with option sets 506*a*-506*f* (generally 506) which specify certain communication parameters to dictate communication between the devices 502 within the Intercom group. The option sets 506 within for each device 502 in the example shown are configured to allow the communication devices 502 within the "Intercom" talk group to communicate freely. For example communication device 502*a* has a selection of at least two option sets 506*a*, 506*b* corresponding to the first two channels S1 and S2 respectively. The option sets 506*a*, 506*b* are set to an output of "All Rx" and an input of "Mic". These settings allow the corresponding communication device 502*a* to hear all output from communication devices 502 within the Intercom talk group, and similarly allows transmission of input audio to all other devices 502 within the Intercom group. Further, while the first two option set selections 506 associated with the first two channels S1, S2 of each device 502 are shown as being the same, the user could also set different communication parameters within each option set 506. For example, in the second option set 506*b* for the first device 502*a*, the input could be switched to "Off", allowing the user of the corresponding communication device 502*a* to mute their microphone by switching to channel S2 which is associated with the second option set 506*b*. The communication device 502*a* could also be allowed access to additional option sets. To that end, the communication device 506*a* could allow the user to switch to a third or fourth channel S3, S4 to activate additional option sets 504*a*, 504*b*. Option sets 504*a*, 504*b* are set in a default "Off" position for both input and output. Therefore if the device 506*a* switches to channels S3, S4, the device 506*a* can avoid communication with other devices within the Intercom group (unless the communication is the result of inclusion in an additional, separate talk group). In some cases, the option sets 506 correspond to soft buttons on the communication devices and activating a soft button causes the communication device to switch to a particular channel corresponding to that soft button to run on the associated option set. The other devices 502*b*, 502*c* can be configured similarly to the device 502*a*.

Turning to FIG. 5B, within the interface 500*b* the user has created a second talk group labeled "Radio 1". The Radio 1 talk group also includes the devices 502*a*, 502*b*, 502*c* that are within the Intercom group. In this case, each device 502 has a first channel "S1" with an option set 512*a*, 512*b*, 512*c* which allows the device 502 to hear all output within the Radio 1 group. Further, an additional device 510 labeled "Radio/Line 1" is included within the Radio 1 group. The device 510 is a two way radio signal transmitting and receiving device that is in communication with the other communication devices 502 within the Radio 1 group. The input/output options of the device 510 are set to "RadioTx" and "RadioRx", respectively, allowing the device 510 to transmit to all communication devices 502 within the Radio 1 group, as well as receive from all devices of the Radio 1 group. However, when on the first channel "S1", the communication devices 502 within the Radio 1 group have their input settings set to "Mic-PTT", meaning they will only be heard within the Radio 1 group when an activation mechanism, such as a PTT button, is used. In other words, the Radio 1 talk group is designed such that Radio 1 audio is always received by each device 502 but only transmitted when a PTT button is held. Even when the PTT button is not held, the devices 502 may still hear one another by virtue of their inclusion in the Intercom talk group. The device 510 only hears the devices 502 when their respective PTT button is activated since the device 510 is not included in the Intercom talk group. Further, if the devices 502 select a different option set (e.g. the option sets related to channels S2-S4), their output and input is set to "Off" and they will not transmit or receive within the Radio 1 group. The communication devices 502 can be configured such that activating a particular channel S1-S4 activates a like channel S1-S4 and corresponding option set within each talk group that device 502 is a part of For example, activating a first soft button of device 502*a* could activate all option sets within channel "S1" on each talk group (e.g. option set 506*a*, 512*a*). Likewise, a second soft button could activate all option sets within channel "S2" (e.g. 506*b*, 514*a*).

Referring now to FIG. 5C, a third talk group labeled "Radio 2" was created using the interface 500*c*. The Radio 2 group includes the devices 502 as shown in interface 500*b*, but adds an additional device 520 which is similar to the device 510. The key difference between the option sets show in FIG. 5C is that the communication devices 502 only communicate with the device 520 when the communication devices 502 are running on the second channel "S2". To that end, the second channel S2 for each device 502 relates to option sets 522a, 522b, 522c, respectively, which are set to an output of "All Rx" (allowing the devices 502 to hear any communication within the Radio 2 group) and an input of "Mic-PTT" (only providing input from one of the devices 502 to the Radio 2 group when a PTT button is activated). All other option sets 524a-524g are not configured and/or left in a default "Off" position, providing no communication between them via the Radio 2 group when the other channels S1, S3, S4 are activate. Therefore when any device 502 switches between the first and second channels S1, S2, the devices 502 will switch between which device 510, 520 is heard and receives push-to-talk input from the devices 502.

Once the talk groups have been configured (e.g. as shown in interfaces 500), a user can switch between channels to cycle through the options sets on a communication device 502. For example, a communication device 502 can have a number of select buttons associated with each of the channels S1-S4. Activating a select button related to a particular channel causes the device to function under the parameters set forth for that channel within each talk group. Alternatively, the user's communication device 502 may have a single soft button which rotates through all possible channel selections and corresponding option sets. In that case, a visual or audio prompt can alert the user as to which channel is currently active once a user switches channels. When the talk groups are arranged as shown in interfaces 500, activating the first channel S1 allows free communication between the devices 502, with each device 502 being able to receive audio from and send audio to any other device 502. On channel S1, the devices 502 will also be able to hear audio coming from the device 510, and can be heard by device 510 by activating a PTT button. On channel S2, the devices 502 can still freely communicate except that they will not hear, or be heard by, the device 510. However, on channel S2, the devices 502 will be able to hear the device 520 and be heard by the device 520 when their PTT button is activated. Selecting channels S3-S4 will result in no communication between any of the devices 502, 510, 520 via the talk groups shown in interfaces 500 (however, these channels could configured in other talk groups not shown).

Figure 6A:
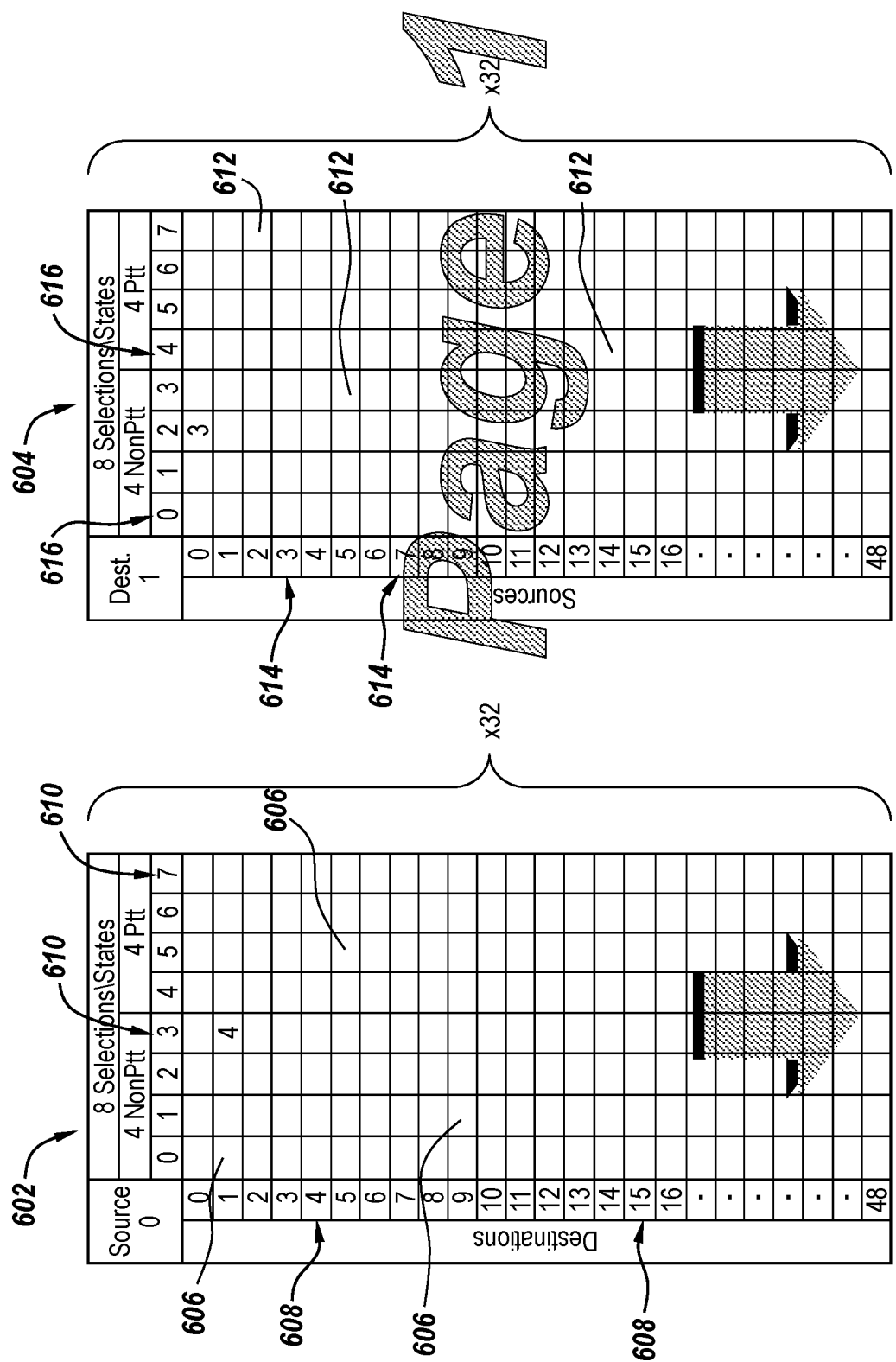
FIG. 6A is an example of data tables configured to control communication devices within the intercom system in accordance with the subject technology.

Referring now to FIG. 6A, the master station 102 includes software which processes incoming digital signals to implement the master station 102 settings shown and described herein and control the communication between the devices. The software does so by relying on a series of tables 602, 604 stored within the memory of the master station 102. The tables are populated with information via input from a user which can be, for example, by configuring channels and talk groups through an interface run on a web browser, as discussed above. Notably, it should be understood that the tables 602, 604 shown in FIG. 6 are a visual representation of the organization of information in the underlying improved method of controlling communication.

Typically, each communication device within the system 100 will have an input table 602 for an audio source (e.g. microphone or input source) and an output table 604 for an audio destination (e.g. speaker or output source). While the tables 602, 604 are largely shown as not populated in the example of FIG. 6, some, or all of the cells will typically be filled once the channels have been completely configured within the master station 102. The cells 606 within the input table 602 are contained within a row 608 corresponding to a particular destination on the system 100, each destination being a separate communication device on the system in communication with the device utilizing the table 602. The cells 606 are also located within a column 610, each column 610 relating to one or more of the channel selections for the device. Each cell 606 stores information to control volume between the device and a separate device on the system 100 depending on how each channel has been configured (e.g. through the processes of FIGS. 5A-5C). So for example, when the communication device associated with source "1" selects channel "3", the value of "4" will be returned for a volume control. The value "4" for a volume control can relate to, for example, a representative decibel level for communications between the device using the table 602 and the source "1" device. In this way, the rows 608 and columns 610 form a multidimensional array of cells containing volume control information.

Likewise, each device will also have an output table 604 which includes a multidimensional array of cells 612 containing volume control information for when the device is acting as an output device (i.e. receiving and outputting a signal from another device on the system). Similarly to the input table 602, each cell 612 on the output table 604 is contained within a row 614 which corresponds to a separate device on the system and a column 616 which relates to a channel which the devices can access. Notably, the terms "row" and "column" are used to describe linear arrays of data within the tables 602, 604 and are not meant to designate a specific orientation where rows must run horizontally and columns must run vertically (although this is the way the rows and columns are shown by way of example in FIG. 6A). In other embodiments, the roles of the rows and columns in FIG. 6A could be reversed.

Since each communication device on the system has a corresponding input and output table 602, 604, the communication between any two devices will result in two cells being called upon. For example, when input into a first device is being sent to a second device for output, one cell on the input table 602 of the first device (the "input device cell") and one cell on the output table of the second device (the "output device cell") are called upon. In at least one embodiment of the subject technology, the ultimate volume that is disseminated from the second device (i.e. the device generating an output) is the result of a comparison between the input device cell and output device cell. In particular, the input cell value and the output cell value are compared and the lower volume control value is selected and relied upon for transmitting signals between the devices. The calculated volume is then transformed into a value which can be provided to adjust the signal between the devices during digital signal processing, as discussed in more detail below.

By storing the volume control information for each device in an associated input and output table, the system 100 needs only to retrieve two tables from the memory bank to facilitate communication between two devices. Further, the tables are stored such that they are easily retrievable by a lookup tag associated with the corresponding communication device. Therefore when the system 100 receives a request to transfer audio between two devices, the system 100 is able to quickly retrieve the relevant tables and define the communication between the devices (e.g. determine a volume of audio to be transferred).

Using the method of storing audio routing data using multiple tables and interrogating the values of each one to derive a final audio route allows several advantages. The tables can easily be indexed and selected using pointers to instantly change routing without excessive processing power. Audio routing data remains human readable in these tables and well organized. Tables and the algorithms that interrogate them can be easily upgraded and expanded to allow for addition features. In this way, this technique provides for a significant technological improvement over those previously employed.

Figure 6B:
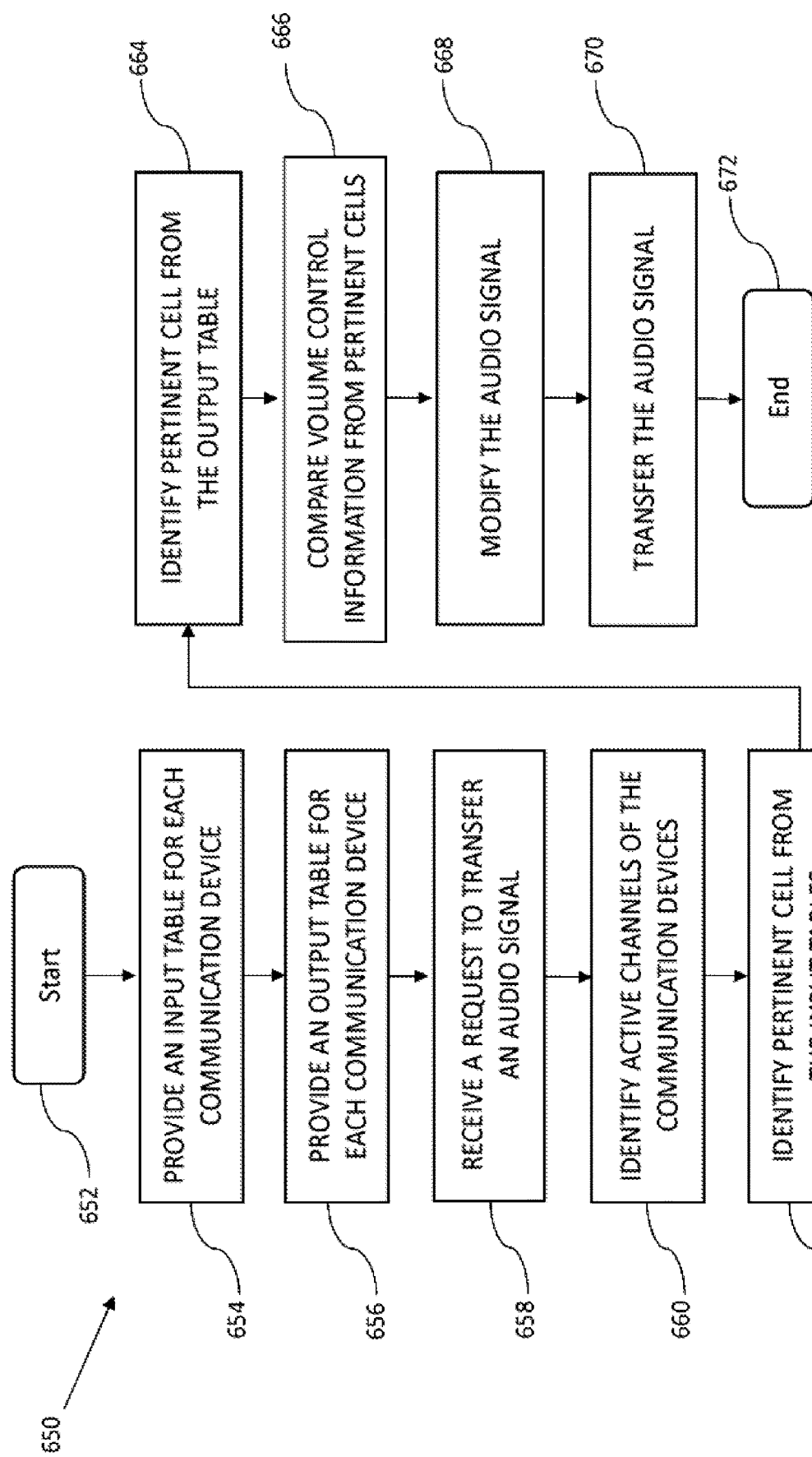
FIG. 6B is a flowchart showing a method of controlling communication between communication devices within the intercom system in accordance with the subject technology.

Referring now to FIG. 6B, a method 650 of managing communications between multiple communication devices on the system 100 through use of the tables 602, 604 of FIG. 6A is shown. At step 652, the method 650 begins. At step 654, an input table is provided for each communication device. The input table has a plurality of first linear arrays corresponding to the other communication devices on the system 100, like the rows 608 shown in FIG. 6A. The input table also has a plurality of second linear arrays and corresponding to communication channels, such as the columns 610. The first and second linear arrays intersect to define associated cells. The cells contain volume control information for the device and channel that correspond to the associated first linear array and second linear array, respectively.

At step 656, an output table is provided for each communication device. The output table has a plurality of third linear arrays corresponding to the other communication devices on the system 100, like the rows 614 shown in FIG. 6A. The output table also has a plurality of fourth linear arrays corresponding to communication channels, such as the columns 616. The third and fourth linear arrays intersect to define associated cells. The cells contain volume control information for the device and channel that correspond to the associated third linear array and fourth linear array, respectively.

At step 658, a request has been generated to transfer an audio signal from a first communication device to a second communication device, for example, by a user setting the first communication device to a channel and speaking into a microphone on the device. The request to transfer the audio signal is received by the system 100. The first communication device is set to a channel which is identified as the first active channel at step 660. Similarly, at step 660, the second communication device is set to a channel which is identified as the second active channel. The active channels for each device can be set locally at each device. For example, as described above, the devices can have one or more buttons which are used for switching between possible channels to select an active channel.

The system 100 then calls up, or locates, the input table of the first communication device and the output table of the second communication device as needed. The input table is used for the first communication device as the first communication device is attempting to transfer audio. Likewise, the output table is used for the second communication device as the second communication device is attempting to receive audio (or said another way, the first communication device is attempting to send the audio signal to the second communication device).

From the input and output tables, the relevant cells are identified which relate to communication between the first and second communication devices along the active channels. To that end, turning to step 662, a first cell is identified from the input table. The first cell is defined from the first linear array corresponding to the second communication device and the second linear array corresponding to the first active channel. The first cell will have volume control information germane to transferring audio from the first communication device to the second communication device when the first communication device is set to the first active channel. Similarly, at step 664, a second cell is identified from the output table. The second cell is defined from the third linear array corresponding to the first communication device and the fourth linear array corresponding to the second active channel. The second cell will have volume control information germane to transferring audio from the first communication device to the second communication device when the second communication device is set to the second active channel.

After steps 662 and 664, two sets of volume control information will have been identified-volume control information associated with the first cell and volume control information associated with the second cell. The two sets of volume control information are then compared at step 666, and at step 668 the audio signal of the audio transfer request is modified based on the comparison of the volume control information. The volume control information is generally used to determine the volume of the audio for the audio signal that will be sent from one communication device to another (e.g. in the present example, from the first communication device to the second communication device). For example, when talk groups with different channels are set up within the system 100, each channel will have parameters for communication between devices on the system 100, as discussed above. These parameters can include volume control information for communication from one communication device to another. Therefore, depending on how the channels are configured, the volume control information may dictate that when the second communication device is on a second channel it hears the first communication device at full volume, at a volume less than full volume, or not at all (i.e. the first communication device is muted. The parameters, channels, and volume control information can be set from the master station, the master station being connected to the communication devices by Ethernet.

In some cases, during the volume control information comparison at step 668, the volume control information in the first cell and the second cell can be viewed as suggested volumes for communication between the relevant devices. The suggested volumes in the first cell and second cell can then be compared and a smallest suggested volume determined, the smallest suggested volume being the smaller of the two values. In that case, the audio signal can be modified based upon the smallest suggested volume from the first and second cells.

Figure 7:
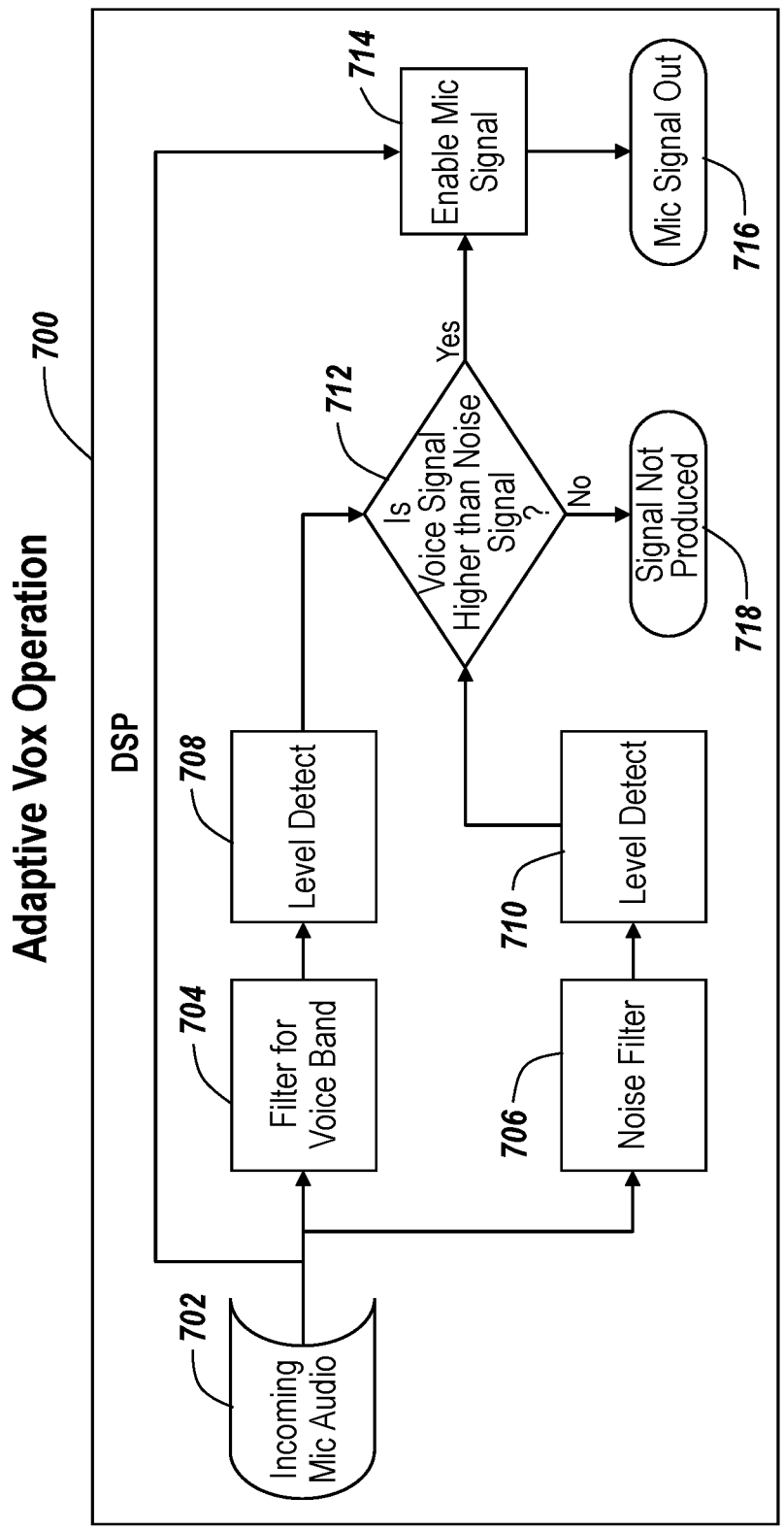
FIG. 7 is a method of processing digital signals within the intercom system in accordance with the subject technology.

The modified audio signal can then be transferred, at step 670, from the first communication device to the second communication device. Under certain circumstances, however, the modified audio signal need not be transferred to the second device. For example, when the governing volume control information dictates that the first communication device should appear muted to the second communication device, the audio signal need not be transferred. Along the same lines, if the first communication device is receiving a large amount of noise at the input location (e.g. through the microphone), then it may be desirable to not transfer the signal. To that end, signal processing can be done, as seen in FIG. 7 and discussed below, to filter noise and/or determine whether the audio signal should be transferred. Thus the noise level (i.e. level of unwanted audio not generated by the user) and voice level (i.e. level of input coming from a human voice) within the audio signal can be compared, and the signal is transferred only when the voice level is greater than the noise level. Notably, in some cases the step of comparing the noise and voice level can take place within a communication device, and a request to transfer audio is only generated (i.e. step 658 only occurs) after it is determined that the voice level is greater than the noise level. The method 650 then comes to an end at step 672, and can be repeated if/when another request to transfer audio comes in.

Referring now to FIG. 7, an example of a block diagram of a method 700 of processing signals within the system 100 in accordance with the subject technology is shown. The method 700 is relied upon when audio is passed from a communication device through the system 100 to determine if the transmitted audio is coming from a human voice or just background noise. Physically, this process typically takes place within the communication devices themselves, such as within the headset and/or within an endpoint. Input audio from any of the devices within the system 100 can be subject to the signal processing method 700 before the audio is transmitted to other devices on the system 100.

The method 700 begins when an audio signal 702 is received, for example, through input from a microphone from one of the headsets of a communication device. The audio signal is then passed through both a voice band filter 704 and a noise filter 706. Each filter 704, 706 is configured to pass frequency within a given range and reject frequency outside of that range. For example, the voice band filter 704 is calibrated based on an expected voice frequency band, while the noise filter 706 is calibrated to detect frequency outside of the expected voice frequency band. Level detectors 708, 710 then detect strength of the signal that has passed through the voice band filter 704 and noise filter 706, respectively. At block 712, the strength of the voice and noise signals, as determined by the level detectors 708, 710, is compared. If the voice signal strength is higher than the noise signal strength, the communication device which transmitted the audio (e.g. the headset) is enabled at block 714 and the audio is produced within the proper channel at block 716, as described above. On the other hand, if the noise signal strength is greater than the voice signal strength then the device is silenced or muted at block 718 and the signal does not pass to the other devices within the system 100.

Figure 8:
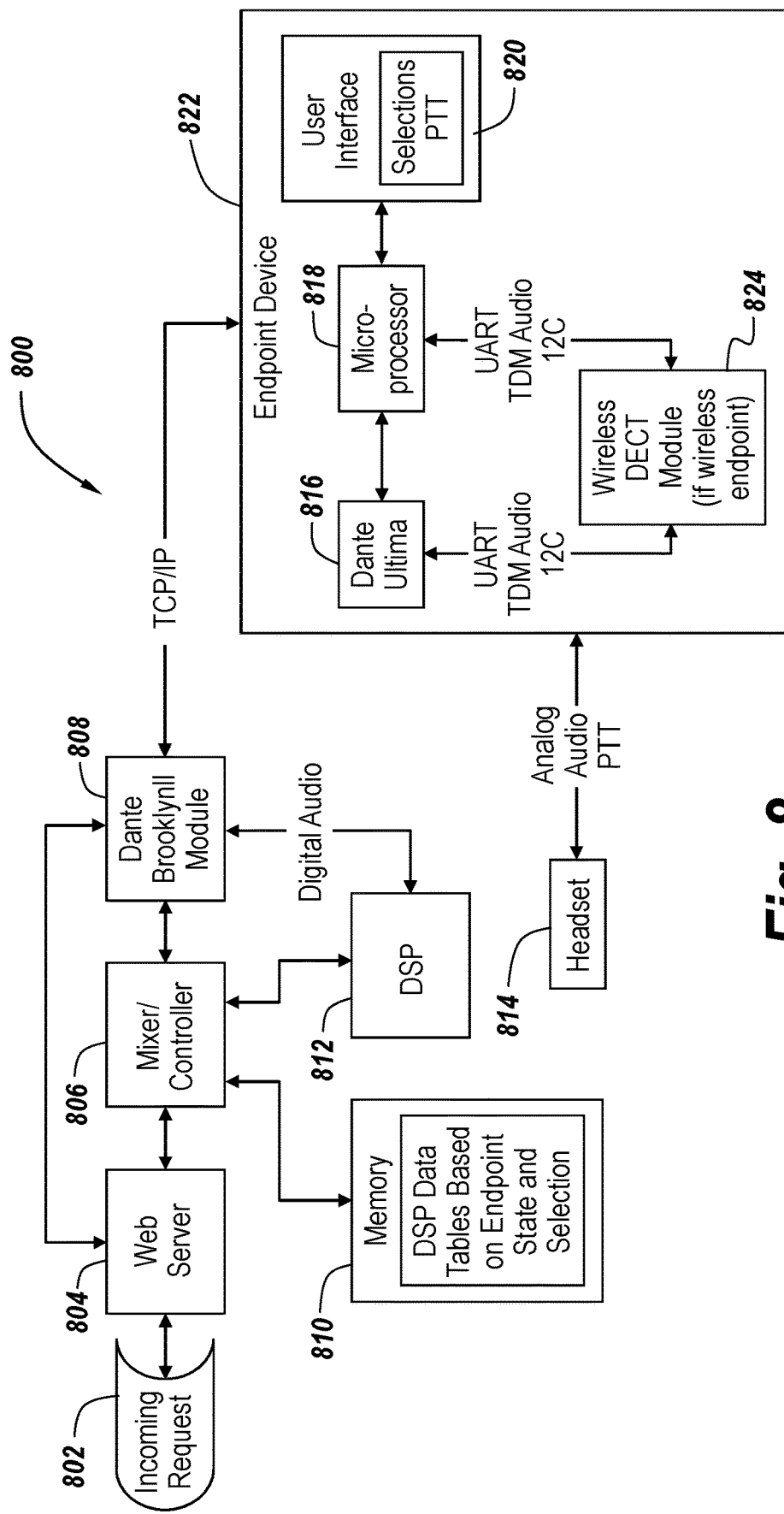
FIG. 8 is a block diagram of showing communication with the digital intercom system in accordance with the subject technology.

Referring now to FIG. 8, a high level block diagram 800 of communication within the system 100 is shown, including the web server which runs within the master station on a microcontroller. Whenever the GUI is used to query or make changes to the system 100 (e.g. changes are entered into master station 102), the communications shown in block diagram 800 are employed. For example, an incoming request 802 can be received via the web server 804, the request 802 then being provided to a mixer/controller 806. If the request is digital audio network through Ethernet ("Dante") related, it is sent to the Dante module 808 within the master station 102. Dante related requests can be, for example, a listing of all endpoints on the network, querying, making, or breaking Dante audio routes or subscriptions (i.e. connections with other devices through Dante modules), querying or making configuration changes to any endpoint device, or the like.

Notably, the endpoint device 822 can be any Dante-enabled device which is connected to the master station 102 via an Ethernet connection, such as a wired or wireless endpoint, or a headset 814. In the case of a wired endpoint, a headset 814 is connected directly to the endpoint and the user interface 820 is located on the wired endpoint itself. In the case of a wireless endpoint, the wireless endpoint is connected to the master station 102 via Ethernet but the endpoint contains a DECT module 824 which communicates wirelessly with a belt station which also has a DECT module. The headset 814 is then connected to the belt station. Each endpoint 822 on in system 100 also includes a microprocessor 818 which manages the non-audio configuration data and the user interface.

From the Dante module 808, the request is then routed accordingly to the applicable endpoint device 822. The signal from the Dante module 808 can be transmitted over a TCP/IP Ethernet network where the request is received by a corresponding Dante module 816 within the endpoint device 822. The Dante modules 816 connect each endpoint 822 to the TCP/IP Ethernet network of the system 100 while also managing audio and non-audio configuration data. The Dante module 808 of the master station 102 has audio channels which are virtually connected to the Dante modules 816 within each endpoint device 822, forming subscriptions between the corresponding devices. In this way, audio is passed between the master station 102 and the endpoint device 822 over the Ethernet. After any request 802, a status is returned by the webserver 804 as a response to the request 802 which indicates whether the request was successful or not. The system 100 can then take appropriate action to retry the request or report the failure to the user via the GUI.

If the incoming request 802 is not Dante related, and is instead related to the talk groups, it will instead be sent to the DSP mixing module 812. Such a request 802 can enter an endpoint 822 from a headset, pass, over Ethernet, from the Dante module 816 of the endpoint 822 to the Dante module 808 of the master station 102. The Dante module 808 will then pass the audio digitally to the DSP mixing module 812 where all dynamic mixing of audio on the system 100 is done. After every update to the communication data tables (e.g. FIG. 6A), the mixer/controller scans the memory bank 810 where the table configuration information is stored. Therefore the mixer/controller 806 can provide updated data from the relevant tables to the DSP mixing module 812 for processing. Further, the table information retrieved from the memory bank 810 will be dependent on which devices are communicating and which channel is selected on the communication (i.e. which cells from FIG. 6A are pertinent). As such, depending on the communication devices exchanging information and the channel selections of those devices, the mixer/controller 806 can provide relevant tables and/or relevant data points generated from the tables to the DSP mixing module 812. The DSP mixing module 812 can then route the final digital signal, via the Dante module 808, to a separate endpoint device which will use the signal to output audio through a communication device. Alternatively, the DSP mixing module 812 can be configured to route the audio out to or in from a radio/auxiliary card to a 2-way radio or auxiliary device. In this way, signals are sent between two communication devices through the system 100.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., transmitters, receivers, inputs, outputs, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology.

For example, each claim may depend from any or all claims in a multiple dependent manner even though such has not been originally claimed.

What is claimed is:

1. A method of managing communications between a plurality of communication devices within a digital intercom system comprising:
    providing, for each communication device, an input table comprising: a plurality of rows each corresponding to a different one of the communication devices on the system; a plurality of columns each corresponding to a communication channel of a plurality of communication channels defining parameters dictating how the communication devices within the system will communicate; and a plurality of cells each defined by an associated row and an associated column of the input table, the cells containing volume control information for communication with the communication device corresponding to the associated row and over the communication channel corresponding to the associated column;
    providing, for each communication device, an output table comprising: a plurality of rows each corresponding to a different one of the communication devices on the system; a plurality of columns each corresponding to one of the communication channels; and a plurality of cells each defined by an associated row and associated column of the output table, the cells containing volume control information for communication with the communication device corresponding to the associated row and over the channel corresponding to the associated column;
    receiving, from a first communication device of the communication devices, an audio transfer request to send an audio signal to a second communication device of the communication devices;
    identifying a first cell from the cells of the input table of the first communication device, the first cell defined by a row corresponding to the second communication device and a column corresponding to an active channel of the communication channels of the first communication device;
    identifying a second cell from the cells of the output table of the second communication device, the second cell defined by a row corresponding to the second communication device and a column corresponding an active channel of the communication channels of the first communication device;
    comparing the volume control information of the first cell with the volume control information of the second cell; and
    modifying the audio signal based on the comparison of the volume control information of the first cell with the volume control information of the second cell.

2. The method of claim 1 further comprising:
    processing the audio signal to compare a noise level within the audio signal to a voice level within the audio signal; and
    transferring the audio signal from the first communication device to the second communication device if the voice level is greater than the noise level.

3. The method of claim 1 further comprising transferring the audio signal from the first communication device to the second communication device.

4. The method of claim 3 wherein the communication channels are configured from a master station connected to all the communication devices by Ethernet.

5. The method of claim 4 wherein each communication device includes at least one button, the active channel for the communication device being set by activating one of the buttons.

6. The method of claim 5 wherein the volume control information includes a suggested volume.

7. The method of claim 6 further comprising:
    determining a smallest suggested volume based on the volume control information of the first cell and the volume control information of the second cell,
    wherein, in the step of modifying the audio signal, the audio signal is modified based upon the smallest suggested volume.

* * * * *